Jan. 16, 1951     I. S. JOSEPH     2,538,524
THERMALLY INSULATED CONTAINER
Filed Sept. 5, 1947
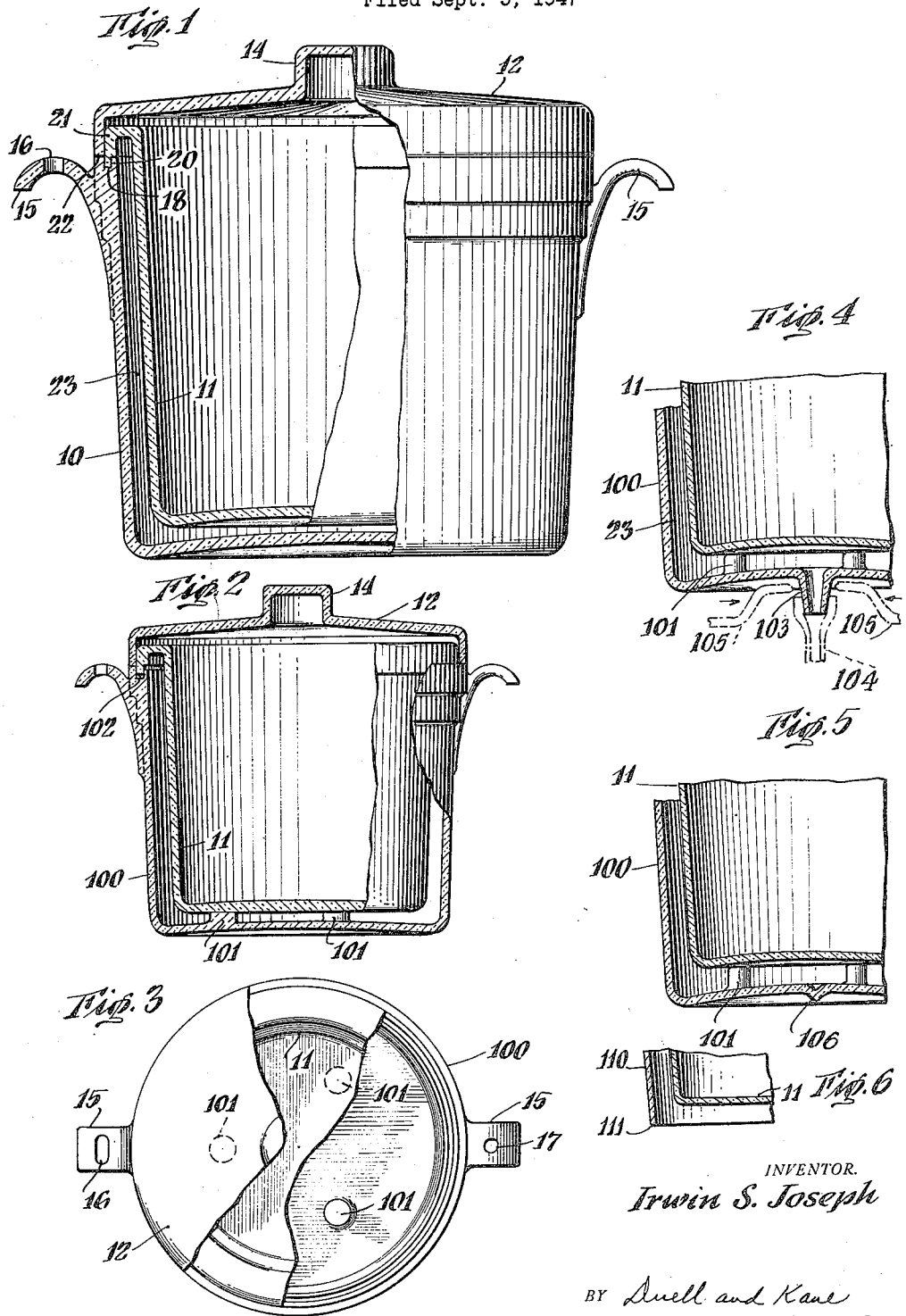
INVENTOR.
Irwin S. Joseph
BY Duell and Kane
ATTORNEYS Patented Jan. 16, 1951

2,538,524

UNITED STATES PATENT OFFICE 2,538,524

THERMALLY INSULATED CONTAINER

Irwin S. Joseph, New York, N. Y., assignor to Brrr, Inc., New York, N. Y., a corporation of New York Application September 5, 1947, Serial No. 772,332

2 Claims. (Cl. 220—9)

This invention relates to an improved thermally insulated container for chilled or heated foodstuffs, ice cubes, and the like.

It is an object of the invention to provide a thermally insulated container in which an inner receptacle is suspended from the upper marginal edge of an outer casing, so as to provide spaced inner and outer walls which afford efficient thermal insulation.

It is an object of the invention to provide a double walled container in which an inner receptacle is suspended from an outer casing by an interlocking structure which efficiently seals the connection between the inner and outer walls, therefore making it practical to evacuate said space if desired, to increase the thermal insulation qualities.

It is a further object of the invention to provide a double walled container which may be inexpensively molded from thermo-plastic material.

It is a further object of the invention to provide a double walled container which may be molded from thermo-plastic materials, the molding method affording a tubular neck which may be attached to an evacuating pump to exhaust the air contained between the inner and outer walls, or through which finely comminuted insulation material may be blown to occupy the space between said walls.

Other objects and advantages of the invention will be apparent from the following detailed description and the accompanying drawings, in which:

Fig. 1 is a vertical elevation, partially in section, showing a preferred form of the invention;

Fig. 2 is an elevation, partially in section, showing a second form of the invention;

Fig. 3 is a top plan view of the embodiment of Fig. 2, with the inner receptacle having been broken away;

Fig. 4 is a partial side sectional elevation showing the manner in which the molding process for the external casing provides a short tubular neck at the bottom of such casing;

Fig. 5 illustrates a further manufacturing step in which the tubular neck of Fig. 4 has been sealed off; and Fig. 6 shows another form of outer casing.

Referring now to the drawings for a more complete description of the invention, a presently preferred embodiment of my invention includes an outer casing 10, an inner receptacle 11, and a cover 12. Desirably these are molded from the transparent thermo-plastic materials, such as polystyrene, so that the quantity of the contents of the inner container may be observed without the necessity of removing the cover. Such materials are also advantageous in that they have low thermal conductivity, and will reduce heat transfer and minimize "sweating" when ice or chilled foods or liquids are within receptacle 11.

The cover 12 has a suitable knob or handle portion 14, which may have a grooved or serrated outer surface, and the outer casing 10 is provided with integral handles 15, which may, if desired, be formed with passages 16, 17, to accommodate ice tongs, ice picks, food-serving implements or other conventional accessory.

It will be noted from Fig. 1 that the relatively broad upper rim 22 of the casing 10 is formed with a groove 18, within which fits the tongue 20 provided at the end of the short downwardly extending wall portion 21 of the receptacle 11. The outer surface of wall 21 cooperates with the rim 22 to provide a snug seat for the rim of the cover 12.

It will be apparent that the receptacle 11 is, in effect, suspended from the upper edge of the outer casing 10. The tight fit afforded by the interlocking relationship of the inner and outer wall portions of the completed structure affords a dead air space 23 which is, as is well known, an excellent insulation medium. The heat conductivity of the polystyrene resins is low and the extended conductive path afforded by the reverse curvature of the wall of the inner receptacle, greatly reduces heat transfer by conduction along the walls of the unit. In this connection it should be observed that normally, the receptacle 11 will not be filled above the level of the outer rim 22.

In the embodiment of Fig. 2, the outer casing 100 is formed with shoulders or supports 101 upon which the container 11 may rest. This construction is advantageous for containers of large volume in that it relieves the strain on the upper rim connection. In Fig. 2, the depth of the upper rim channels has been increased to provide a space beneath tongue 20 within which may be placed an adhesive mass 102, preferably incorporating a polystyrene solvent which after setting creates what is known in the art as a "welded" joint. Other adhesives may be used, but the solvent-containing material 102 permanently secures the inner and outer structures together and eliminates air leakage at the point of juncture thereof. Such construction is of particular utility when it is desired to evacuate the space 23 between the respective structures.

The molding of the outer casing from thermoplastic materials may be accomplished, as is known in the art, by introducing the flowable material into the mold through a proper gate. By suitable means, such as a core or pin extending from the mold, (not shown) said gate may comprise an annular passage so that after the material has set and the structure has been removed from the mold, there results a short neck 103 as shown in Fig. 4. If it is desired to evacuate the space 23, a vacuum pump connection 104 may be connected to the neck 103 and, after evacuation to a suitable degree, said neck may be pinched off by heated blade-like members 105 to provide a seal 106. The "crown" of the bottom wall of the outer casing 100 makes the slight protuberance resulting from the sealing off of the neck 103, of no importance in that it does not project below the bottom rim thereof.

Where it is desired to fill space 23 with finely comminuted insulation material, said material may be blown into the space through the neck. In practicing this method, it is desirable to place the inner receptacle 11 within the outer casing without securement of the respective upper edges thereof so that the air displaced from the wall space 23 may escape during the filling thereof. After the desired amount of insulation material has been placed, the association of the inner and outer casings may be completed and, if desired, the adhesive material 102 may be applied for permanently bonding the respective container portions together.

It will be apparent that since the container will normally rest upon a table or other flat surface, it is not necessary to provide the outer casing with the closed bottom shown in Figs. 1 and 2. Accordingly, as shown in Fig. 6, the outer casing 110 may be substantially cylindrical, the bottom edge 111 providing a firm support. The low thermal conductivity of the resin, and the fact that the table top effectively seals off the outer container to provide dead air space between the receptacle and the outer casing contribute to the thermal efficiency of the Fig. 6 form. It will be understood that in said form, the upper rim connection between the outer casing and the inner receptacle may be as taught in the Fig. 1 and Fig. 2 structures.

Thus, among others, the several objects of the invention as afore noted are achieved. Obviously numerous changes in construction and rearrangement of the parts might be resorted to without departing from the spirit of the invention as defined by the claims.

I claim:

1. A thermally insulated container including an outer casing and inner receptacle, both formed of material having low thermal conductivity, said casing including a side wall, a relatively broad upwardly facing rim portion integral with and defining the upper edge of said side wall, the surface of said rim being formed with a groove intermediate the opposite side faces of said wall, an outwardly and downwardly extending wall at the upper edge of said receptacle and projecting into said groove to support said receptacle from said rim and the over-all diameter of said receptacle being slightly less than the diameter of said casing whereby said receptacle will be suspended within said casing with the adjacent casing and receptacle faces in close proximity but spaced from each other.

2. A thermally insulated container including an outer casing and inner receptacle, both formed of material having low thermal conductivity, said casing including a side wall, a relatively broad upwardly facing rim portion integral with and defining the upper edge of said side wall, the surface of said rim being formed with a groove intermediate the opposite side faces of said wall, an outwardly and downwardly extending wall at the upper edge of said receptacle and projecting into said groove to support said receptacle from said rim, the over-all diameter of said receptacle being slightly less than the diameter of said casing whereby said receptacle will be suspended within said casing with the adjacent casing and receptacle faces in close proximity but spaced from each other and the outer face of the downwardly extending wall of said receptacle having a diameter less than that defined by the outer edge of said rim portion, whereby to provide in conjunction with the latter a seat for a cover to enclose said receptacle wall and be supported by said rim portion.

IRWIN S. JOSEPH.

REFERENCES CITED

The following references are of record in the file of this patent:

UNITED STATES PATENTS

| Number | Name | Date |
|---|---|---|
| 1,895,212 | Smith | Jan. 24, 1933 |
| 1,955,610 | Seipt | Apr. 17, 1934 |
| 2,194,193 | Barnes | Mar. 19, 1940 |
| 2,311,446 | Knight | Feb. 16, 1943 |
| 2,349,099 | Kircher | May 16, 1944 |

FOREIGN PATENTS

| Number | Country | Date |
|---|---|---|
| 46,161 | Denmark | Sept. 5, 1932 |
| 798,818 | France | Dec. 13, 1934 |